United States Patent
Le Sesne

(10) Patent No.: US 7,113,125 B2
(45) Date of Patent: Sep. 26, 2006

(54) METHOD FOR MEASURING MATERIAL LEVEL IN A CONTAINER USING RFID TAGS

(75) Inventor: Richard H. Le Sesne, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 11/014,512

(22) Filed: Dec. 16, 2004

(65) Prior Publication Data

US 2006/0132351 A1 Jun. 22, 2006

(51) Int. Cl.
*G01S 13/08* (2006.01)

(52) U.S. Cl. .......................... 342/124; 342/42
(58) Field of Classification Search ........ 342/118–125, 342/42–51
See application file for complete search history.

(56) References Cited

U.S. PATENT DOCUMENTS

| | | | | |
|---|---|---|---|---|
| 4,641,139 | A | * | 2/1987 | Edvardsson ................. 342/124 |
| 5,136,299 | A | * | 8/1992 | Edvardsson ................. 342/124 |
| 5,629,706 | A | * | 5/1997 | B.ang..ang.th ............. 342/124 |
| 6,184,818 | B1 | * | 2/2001 | Meinel ....................... 342/124 |
| 6,348,640 | B1 | | 2/2002 | Navot et al. |
| 7,075,479 | B1 | * | 7/2006 | Andersson .................. 342/124 |
| 2002/0188259 | A1 | | 12/2002 | Hickle et al. |
| 2002/0189667 | A1 | | 12/2002 | O'Dougherty et al. |
| 2003/0205581 | A1 | | 11/2003 | Wertenberger |
| 2005/0017895 | A1 | * | 1/2005 | Andersson .................. 342/124 |
| 2006/0132351 | A1 | * | 6/2006 | Le Sesne .................... 342/124 |

FOREIGN PATENT DOCUMENTS

| | | | |
|---|---|---|---|
| CA | 2325174 | | 11/2000 |
| JP | 3-68818 | | 3/1991 |
| JP | 3-294996 | | 12/1991 |
| JP | 2002-259934 | | 9/2002 |
| WO | WO 90/09599 | * | 8/1990 |

OTHER PUBLICATIONS

Jeffrey D. Lindsay, Walter Reade, "Cascading RFID Tags", IP.COM No. 000021112D, Dec. 23, 2003, pp. 1-10.*
"New Technology Upgrades RF Level Sensing"; Automation and Control, vol. 17, No. 9; Oct. 1986; p. 13-14.

* cited by examiner

*Primary Examiner*—John B. Sotomayor
(74) *Attorney, Agent, or Firm*—Whitham, Curtis, Christofferson & Cook, PC; John R. Pivichny

(57) ABSTRACT

A level of liquid of pulverent solids in a container (or volume of a liquid in the absence of gravity) is detected by using radio frequency identification (RFID) tags or similar transponders located inside or outside the container. The interrogation signal and/or the return signal is attenuated by the material and the signal strength of the return signal, if any, is evaluated either directed or in a binary fashion by imposing a threshold to determine whether or not material in contained in a portion of the container corresponding to the location of a particular RFID tag or transponder. Volume, pressure and container orientation can also be derived in accordance with one or more return signals.

20 Claims, 8 Drawing Sheets

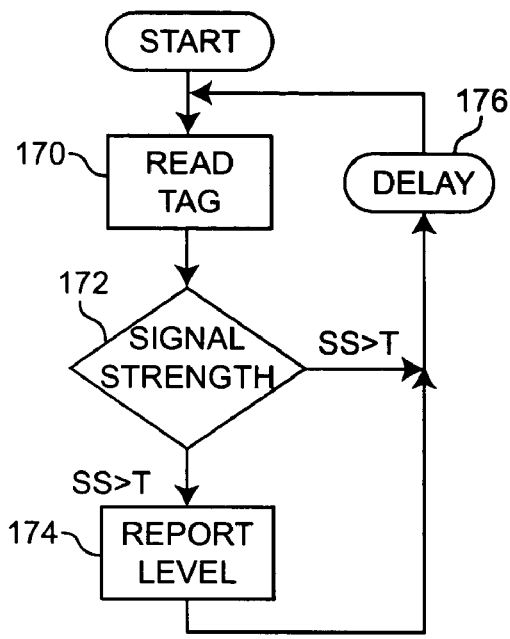
Figure 1C
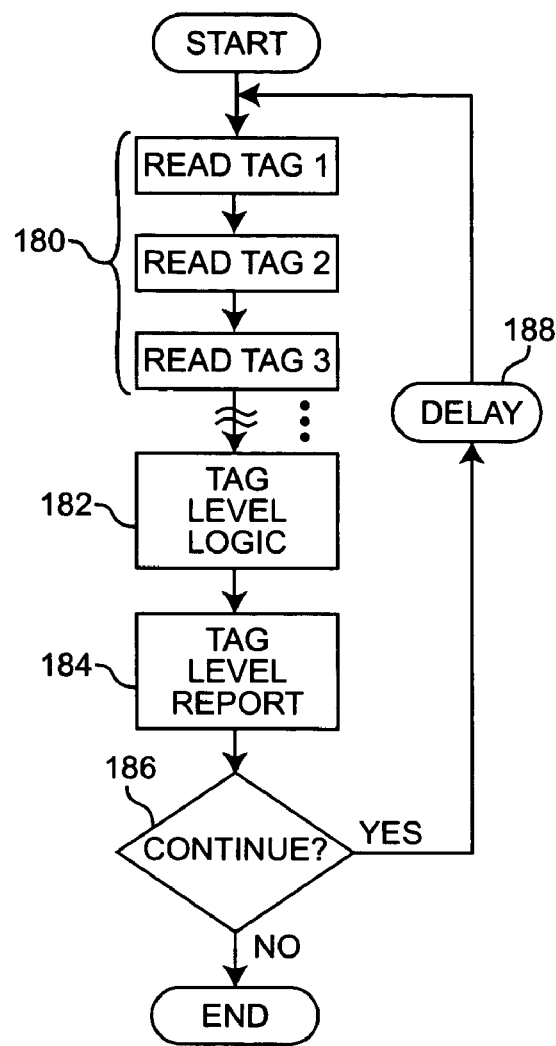
Figure 1D
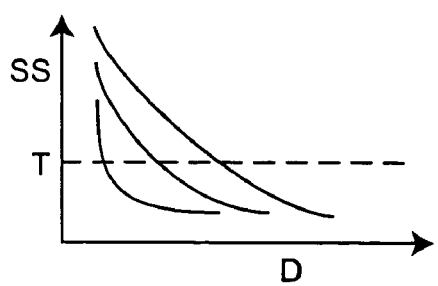
Figure 1E
| DEPTH | ∅ | A | B | C |
|---|---|---|---|---|
| TAG 1 | ON | OFF | OFF | OFF |
| TAG 2 | ON | ON | OFF | OFF |
| TAG 3 | ON | ON | ON | OFF |
Figure 1F

METHOD FOR MEASURING MATERIAL LEVEL IN A CONTAINER USING RFID TAGS

BACKGROUND OF THE INVENTION

1. Field of the Invention

The present invention generally relates to remote measurement and telemetry and, more particularly, to rapid and automated measurement of material levels in containers or vessels and reporting of the results thereof.

2. Description of the Prior Art

Commercial and industrial environments present numerous circumstances and environments in which rapid measurement and reporting of material levels is required. Many require continuous or rapidly repeated (e.g. several times per second or more to support analysis of level variance) monitoring and/or measurement of many levels of many different materials in many containers substantially simultaneously.

While many sensors for measurement of material level are known, many are restricted to particular materials or materials having particular properties such as float sensors or optical reflection sensors for liquids while such sensors are inapplicable to solids. For example, a float of a float sensor may be buried by granular solid materials or fouled by viscous or adhesive materials while granular materials will not make intimate contact with the detection surface of an optical liquid level sensor which viscous or adhesive materials may also foul. Mechanical and optical sensors also tend to be expensive and generally introduce non-linearities (e.g. by a pivoting mechanism or discrete optical surfaces) into the measurement. Further, while these devices may provide effective measurement, they do not generally provide communication of the measurement results and complex additional wired and/or wireless communication systems must be employed in order to do so; often of substantial geographical extent. Such communication systems and hardware elements thereof as well as level sensors may have substantial sensitivity to the measured material which may, for example, present conductive, explosive or corrosive environments or otherwise constitute a potential source of damage to the communication system or present a potential safety hazard.

Moreover, level sensor systems can be quite expensive, especially when a large number of such sensors are required. Additionally, different types of level sensors adapted for different materials may produce outputs in a wide variety of forms and are not inherently calibrated, particularly among the different known types of level sensors. Therefore, substantial processing of the sensor outputs is generally required when material level sensors of different types are employed in a single system.

Radio frequency identification (RFID) systems are also known, principally for article placement and removal detection systems and systems intended to deter theft. In most such systems in current use, a transponder, often referred to as a tag (or RFID tag), is attached to an article of interest and produces a detectable radio frequency signal when interrogated. RFID tags may be either active (e.g. having a power supply associated therewith) or passive (e.g. deriving power from the interrogation signal to charge a capacitor) and may be extremely simple and inexpensive to produce. Perhaps the simplest form of an RFID tag involves an antenna and a very few circuit elements which receive a radio frequency (RF) signal of one frequency which is converted to another frequency and re-radiated. The necessary circuit elements and antenna of the RFID tags can be inexpensively produced together as a single unit in very large numbers by simple printing and laminating processes.

Such tags are often employed for theft deterrence where many articles must be protected by placing a transmitter/receiver unit near a point of egress from the protected premises. If a tag attached to a protected article is brought within range of such a detection unit, the tag will receive a signal, effectively interrogating the transponder, and the returned signal will be detected and the movement of the object reported by an alarm or the like. With only a small increase in complexity and cost, a substantial number of transponders of either the active or passive type can be made uniquely identifiable such as by providing detectably different frequencies as the return frequency. Transponders may also be uniquely identified by providing unique codes to be returned such as for use in automatic toll collection. However, at the present state of the art, the principal application of RFID systems has generally exploited the ability to use inexpensive tags to monitor large numbers of objects at particular locations rather for identification of individual objects.

Further, since transponder tags must be attached to or otherwise integrated with the monitored objects, RFID systems have not been useable for loose solid materials or liquids. In other words, known RFID systems may be readily applied to containers of liquids and packages of materials such as sacks of grain, sand, concrete and the like but not to the material itself such as when a fungible material (e.g. metal scrap, sand, concrete, etc.) is placed in or removed from a container.

SUMMARY OF THE INVENTION

It is therefore an object of the present invention to provide a system for measuring the level of materials in containers which does not employ specially adapted level sensors or require complex communication and/or processing systems.

It is another object of the invention for monitoring material levels in a plurality of containers concurrently or simultaneously on a continuous or rapidly repeated basis.

It is a further object of the invention to provide a material level measurement system which can employ substantially similar transponders, possibly of a single type, for a wide variety of different materials.

It is yet another object of the invention to provide a system for volumetric and other (e.g. hydrostatic pressure) measurements of materials including volumetric measurements of fluids in the absence of gravity such as in a space or orbital environment.

In order to accomplish these and other objects of the invention, an apparatus for measurement of a level or volume within a container of a material capable of attenuating radio frequency energy is provided comprising a radio transponder at a known location relative to the container, and an interrogation transmitter/receiver capable of transmitting a radio frequency signal to the radio transponder across a portion of said container capable of containing the material and evaluating a return signal to determine presence of the material in that portion of the container.

In accordance with another aspect of the invention, a method for measuring material level in a container is provided, comprising steps of transmitting a signal through a portion of a container containing a material capable of attenuating a signal passing therethrough to a transponder, and detecting the material in the portion of said container based on a return signal returned from the transponder.

BRIEF DESCRIPTION OF THE DRAWINGS

The foregoing and other objects, aspects and advantages will be better understood from the following detailed description of a preferred embodiment of the invention with reference to the drawings, in which:

FIGS. 1C and 1D are flow charts illustrating processes for making a measurement from a single RFID tag for a container and plural RFID tags for a container, respectively, FIG. 1E illustrates attenuation of radio signals by measured materials and application of a threshold thereto, FIG. 1F is a table illustrating responses of RFID tags for different levels of material in a container.

DETAILED DESCRIPTION OF A PREFERRED EMBODIMENT OF THE INVENTION

Figure 1A:
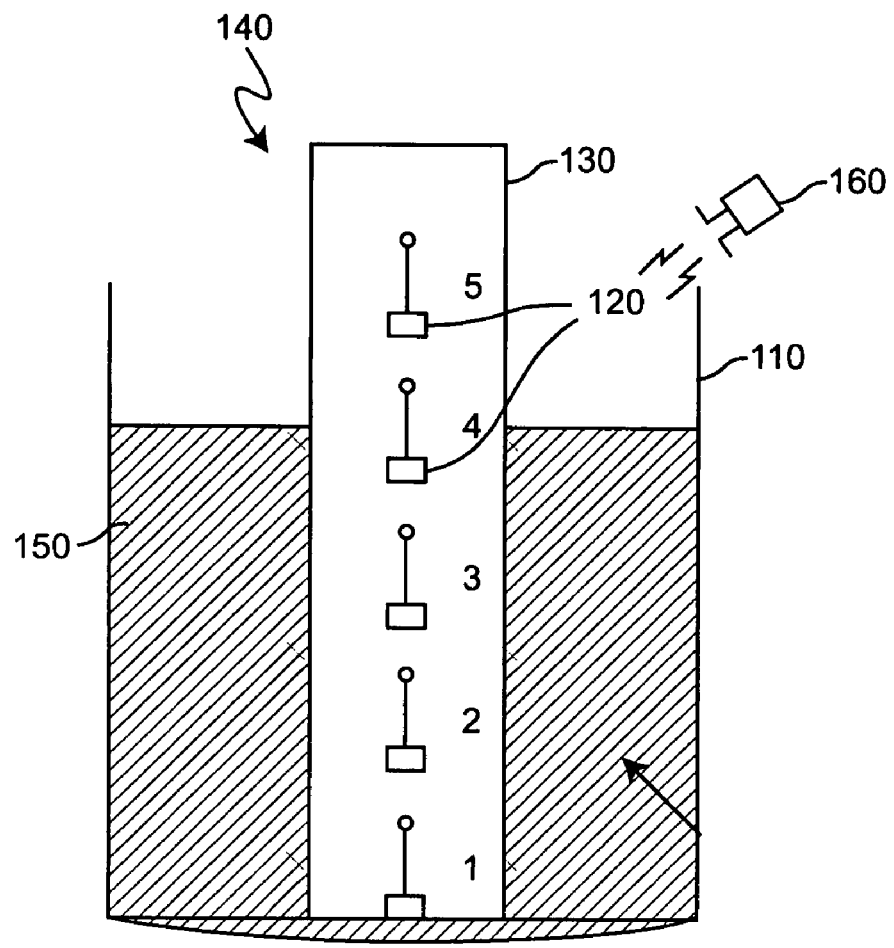
FIG. 1A is a schematic cross-sectional depiction of a container in which material level is detected using RFID transponders in accordance with the invention.

Referring now to the drawings, and more particularly to FIG. 1A, there is shown, in schematic cross-section, a container 110 partially filled with material in which RFID tags are used for material level measurement in accordance with the invention. RFID tags 120 are distributed at different vertical locations 1–5 within the container 110. This distribution of RFID tags 120 can be done in many ways such as attachment to the container wall, suspension along a tether or the like.

However, it is preferred to locate the RFID tags by placement in a protective sleeve 130 which is preferably rigid or exhibits a suitable degree of stiffness to provide accurate vertical location of the RFID tags in an array 140 of known geometry notwithstanding effects of buoyancy, material movement within the container and the like. For this purpose, the sleeve may be in the form of a tube or pipe of desired geometric cross-section or a tubular web which may be flattened, possibly over an inner frame. The material of the sleeve may be freely chosen from among most non-metallic materials to resist chemical or mechanical effects of particular materials which may be placed in the container 110 and preferably is sealed at the bottom end and possibly the top end such that there is no contact between the RFID tags and the material in the container. The material should, however, be substantially transparent to RF energy of the frequency band used to communicate with the RFID tags (which is currently in the MHz or GHz range and is subject to international, national and industry standardization) but can be made very thin to minimize attenuation of signals by the sleeve 130. In any event, as will be discussed below, RF attenuation by the sleeve is generally negligible or can be made so.

Figure 1B:
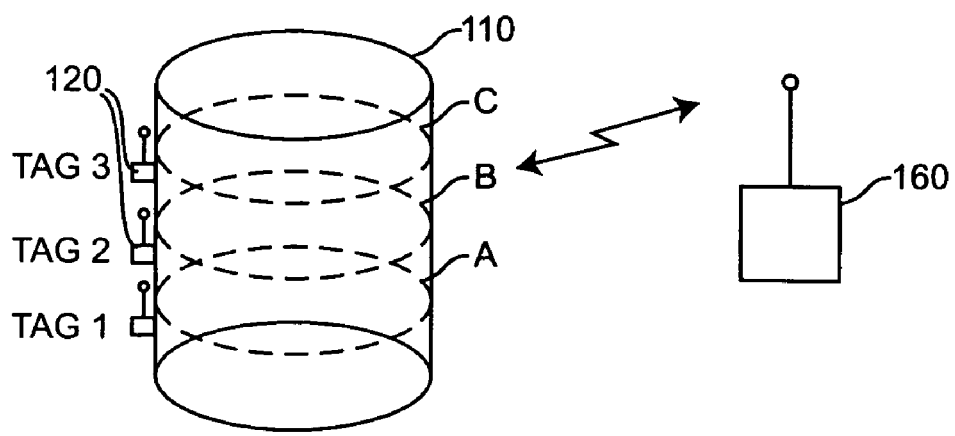
FIG. 1B illustrates a variant form of placement of RFID tags in relation to a container.

The invention exploits the fact that most liquids (such as water, organic liquids colloidal suspensions and slurries, fuels (e.g. gasoline, kerosene and the like, industrial chemicals and acids and cryogenic liquids and many solid materials such as sand, dry cement, iron filings, relatively fine grain and other agricultural products and other pulverized or relatively small particulate materials are substantially opaque to RF energy, at least at thicknesses comparable to dimensions of containers of interest. Liquids, slurries and the like, in the absence of gravity, will tend to form one or more substantially spherical shapes due to surface tension and the invention is equally applicable to making approximate volumetric measurements thereof based on the volume of a sphere having dimensions indicated by the RFID tags or transponders which are determined to be within the sphere. (In contrast, the invention is not readily applicable to non-liquid materials such as scrap metal, coarse stone and the like having a granular size which allows for air gaps through which a RF signal can propagate without substantial attenuation. For that reason, it is expected that the invention may not be applicable to pulverent materials in the absence of gravity if the pulverent materials tend to disperse throughout the container in such environments.) That is, containers of interest and spheres of fluid in the absence of gravity for remote level or volumetric measurement of contents will generally be of at least of sufficient diameter or transverse dimensions to provide significant RF signal attenuation and thus, assuming a substantially central location of the RFID tag array 140 within the container, should present a thickness of material around the RFID tag array of several inches or more or at least sufficient to provide substantial opacity to or attenuation of RF energy (compared to which the thickness and attenuation of sleeve 130 is or may be made negligible). Within this broad constraint, the RFID tag array may be placed at any location within the container. Alternatively, for relatively narrow containers, the RFID tag may be placed outside the container (as may also be desirable for some chemically active materials) opposite interrogator 160, positioned either by attachment to the container or to a supporting structure such as an open frame or enclosing sleeve, as shown in FIG. 1B to require RF signals to pass through the entire thickness of material or across the diameter of the container.

In general, most materials have a characteristic impedance which can also be exploited by the invention to monitor material quality or even identify the material, as generally illustrated by the different curves of signal strength, SS, as a function of material thickness, D, along the signal path shown in FIG. 1E. Generally, the dimensions of containers where it is contemplated to be desirable to employ the invention will be much larger and the effects of thickness and material of sleeve 130 even of lesser comparative effect.

Therefore, RFID tags 120 which are significantly below the surface of material 150 in the container will not be visible to RFID reader 160 either because the transmitted interrogation signal energy will not reach the RFID tags at a sufficient magnitude for the RFID tags to respond or, if some RFID tags respond, the response RF energy will be attenuated below detection levels or a threshold, T, which may be imposed as illustrated by the dashed line at SS=T to allow the system to detect particular RFID tags in a "binary" fashion. In the example illustrated in FIG. 1A, RFID tags 4 and 5 will be detectable while RFID tags 1–3 will not. Thus, RFID tag reader 160 can effectively measure the level of material 150 in container 110 by detection of the number of responding RFID tags or detection and identification of one or more responding RFID tags.

It is also possible to perform detection and/or individual RFID tag discrimination in a (piece-wise, at least) continuous fashion in accordance with signal strength of the returned signal which can also be used to refine the measurement made in an analog manner. For example, a returned signal of reduced signal strength may indicate that the material level only covers the responding RFID tag by a short distance and the signal strength can be calibrated to the depth of such coverage. If continuous measurement of level is desired to good resolution, the attenuation of the RFID tag signal by the material of interest should be considered in determining vertical spacing of RFID tags. This effect may be exploited in other applications of the invention in accordance with its basic principles, as will be discussed in detail below. Further, in the case of using identical RFID tags, individual tags may be discriminated and identified by the strength of the returned signal, assuming proper choice of interrogation signal strength. That is, the strength of the return signal at the RFID tag (for passive tags) will generally correspond to the interrogation signal strength at the RFID tag and the strength of both the interrogation signal and the return signal will diminish in a predictable fashion in accordance with the length of the transmission paths between the interrogator/receiver and the RFID tag and the impedance of materials along that path. To improve accuracy (since RFID tag antennas are generally omnidirectional), the signal path can be well-regulated by collimation as discussed in concurrently filed U.S. patent application Ser. No. 10/037,175 which is hereby fully incorporated by reference. Similarly, the number of covered or exposed RFID tags will alter return signal strength since return signals of like frequency from RFID tags will be superimposed in amplitude and phase.

One of many methods of reading a single RFID tag for material level detection is shown in FIG. 1C. An interrogation signal is sent and a return signal, if any, is received at 170. The signal strength of any detected return signal is then evaluated at 172. It should be appreciated that the criteria illustrated in regard to the signal strength evaluation are arbitrarily placed since a report 174 may be desired only when the level is below the RFID tag (illustrated) or above the RFID tag (in which case the criteria would be reversed). It should be recognized that it is not necessary, in some cases, to impose such a criteria at all but measurement of signal strength as a direct indication of material depth may be preferred.

In essence, the signal strength evaluation 172 provides for a level reporting operation 174 or for bypassing such an operation. in either case, the process preferably loops to the beginning through delay 176 which establishes the frequency at which measurements are made. As is well-recognized in the art, the Nyquist criterion should be observed for measurement frequency in order to observe level fluctuations of interest (by oversampling at two times or more the highest fluctuation frequency of interest).

A preferred method for sensing material level with either a single RFID tag or a plurality thereof is illustrated in FIG. 1D for an exemplary number of three RFID tags as shown in FIG. 1B, for simplicity. The tags, tag 1, tag 2 and tag 3, are read simultaneously or sequentially as indicated at 180 and the results applied to tag level logic 182; an exemplary form of which is illustrated in the table of FIG. 1F. In this exemplary case, the term "ON" is used to indicate a return signal having a signal strength above threshold T and the term "OFF" used to indicate a signal strength below that threshold. Consistent with the above description of FIG. 1A, if all three tags are "ON", the material level will be below level A (e.g. the container is substantially empty) whereas levels A, B and C are respectively indicated by tag 1, tag 2 and tag 3 being covered by RF opaque material or "OFF". In the absence of gravity, as alluded to above, a volumetric measurement may be accommodated directly by such a table which accommodated all combinations of transponders/RFID tags, including individual transponders/RFID tags since liquid level and location of the volume of liquid are not meaningful in the absence of gravity and it is the transverse dimension of the substantially spherical shape(s) the liquid may assume which is/are of interest. Again, as in the above discussion of FIG. 1C, if signal strength were directly monitored to indicate material depth above respective RFID tags, additional material levels could be discriminated. In this case, a material level report is made for every interrogation and response of the RFID tags, as is preferred, as indicated at 184. Then, If it is desired to continue the monitor material level as determined at 186, the process is repeated after a delay 188 which determines a measurement frequency and should observe the Nyquist criterion.

Figure 2:
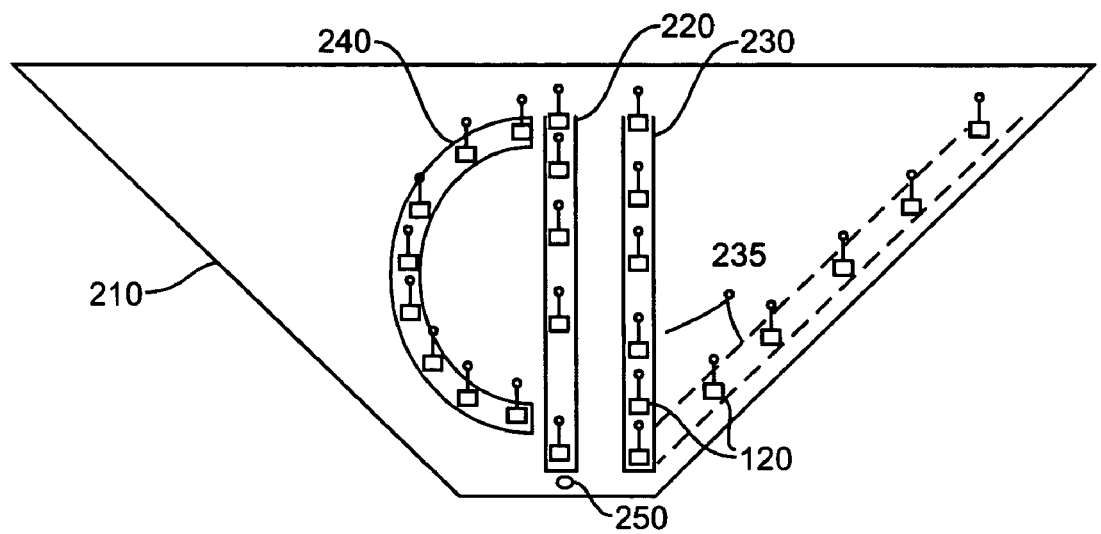
FIG. 2 is a schematic cross-sectional view of a container with varying horizontal cross-section to which the invention may be applied in any of several forms.

It should be understood that the array of RFID tags may take many forms which are not limited to the substantially linear and uniform spacing illustrated in FIG. 1A or 1B. For example, referring to FIG. 2, while a linear array with uniform spacing of RFID tags might be appropriate to directly measure a volume of material in a container of constant horizontal cross-section, in the case of a container of the form of a V-shaped bin 210 or other container of vertically varying horizontal cross-sectional area, the RFID tags might be placed in a array 220 with non-uniform spacing to directly make a volumetric measurement while a second, linear and uniformly spaced array 230 could be concurrently used to indicate hydrostatic pressure at outlet 250. Alternatively, since non-uniformly spaced arrays of RFID tags will also cause variation in resolution of measurements made, different parameters can, of course, be computed for containers of different shapes. Conversely, a non-uniformly spaced array may be used to improve resolution in a critical range of measurement without requiring an excessive number of RFID tags as will be further discussed below in connection with FIG. 5. Other types of spacing arrangements of the RFID tags and differently shaped arrays thereof to correlate with other parameters of interest will be apparent to those skilled in the art. For example, arrays of different shapes (e.g. a curved, arcuate array 240) or plural arrays having an extent in two or three preferably orthogonal directions (e.g. in the shape of a "X" or "V", as shown at 235 of FIG. 2) can also be used to determine orientation of the container as well as material level. In general, the shape of the array and the spacing of RFID tags in the array can be varied at will to accommodate required resolution, shape and/or orientation of the container and/or particular functional requirements.

Figure 3:
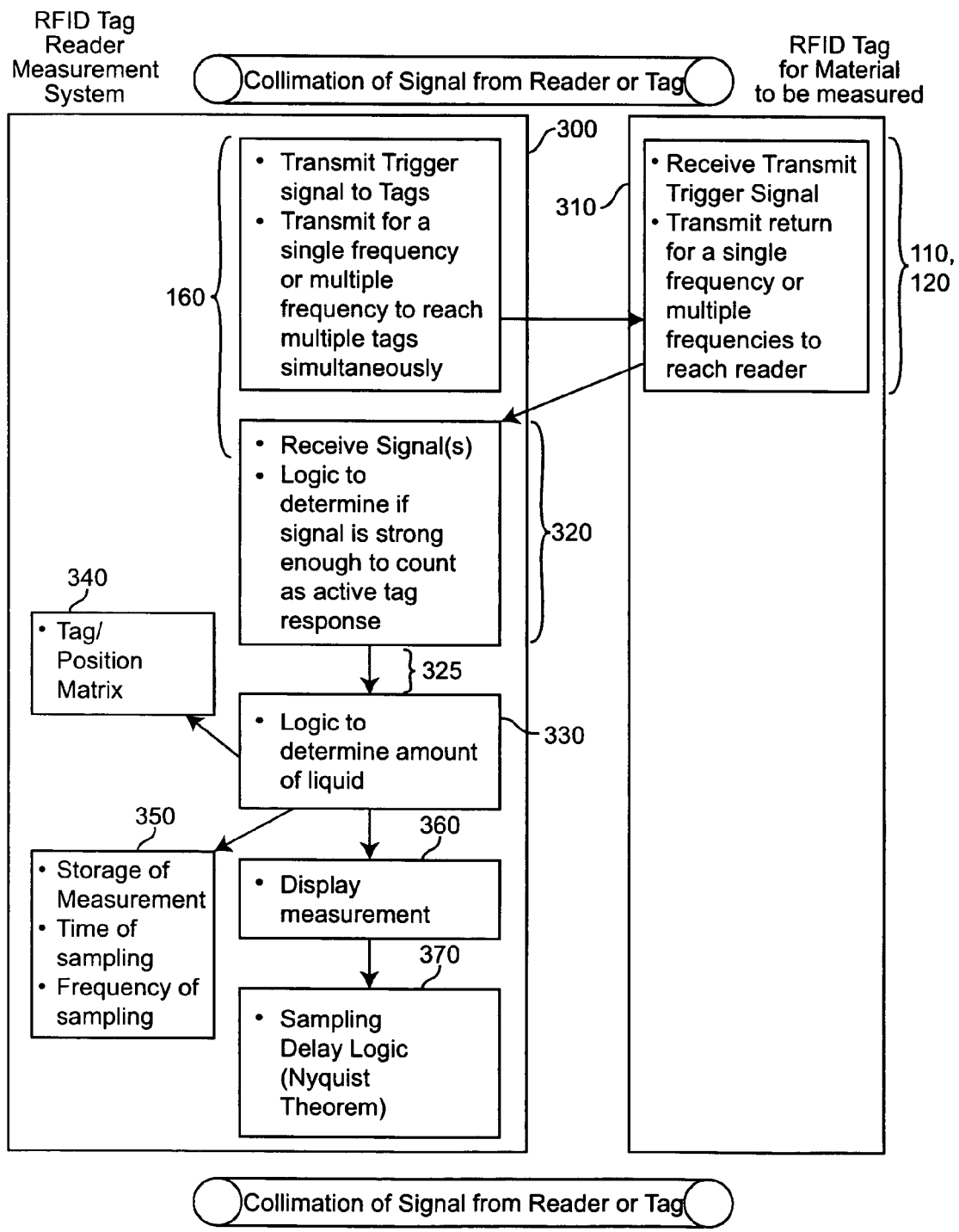
FIG. 3 is a schematic block diagram of a communication and processing system suitable for use in a material level measurement system using RFID tags.

Referring now to FIG. 3, an exemplary system in accordance with the invention will now be discussed. In FIG. 3, reference numeral 300 depicts the physical system of the invention apart from the monitored containers and reference numeral 310 depicts a monitored area where containers 110 and associated RFID tags 120 are located. The functions of interrogator 160 is indicated by a bracket having the same reference numeral. The responding RFID tag return signals are evaluated for identity and/or signal strength at 320, as described above. This information is provided to logic 330 to determine the amount of material or material levels detected. This function may be accomplished, for example by reference to a matrix of RFID tag locations 340, preferably in the form of a look-up table or (e.g. associative) memory. Material volumes, pressure, container orientation and the like corresponding to each container and each RFID tag associated therewith may be stored in such a table or memory.

The results developed by logic 330 may be logged, as desired, as indicated at 350 and recalled in connection with current measurements and desired report formats which will be apparent to those skilled in the art and are not important to the basic principles of the invention. Such reports or current measurements can then be displayed on display 360 and control of measurements made and their repetitions made at 370, including control of RF signal collimating arrangements as will be discussed below.

Figure 4:
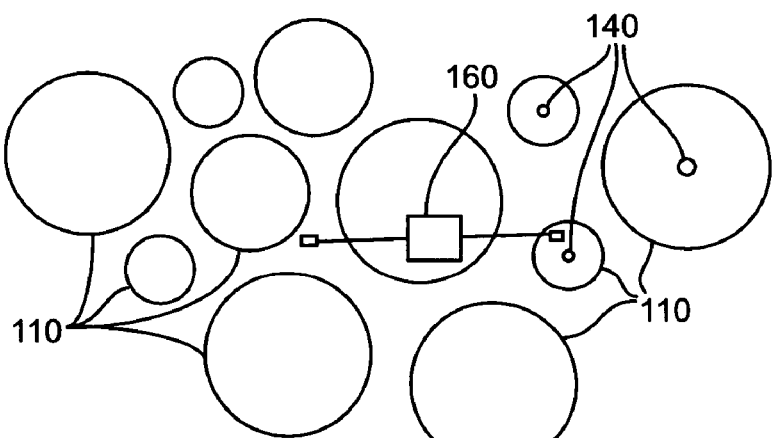
FIG. 4 illustrates application of the invention to a plurality of containers using a single interrogation transmitter/receiver.

FIG. 4 illustrates how a number of containers may be concurrently monitored using the invention. In this case a plurality of containers are providing in arbitrary positions but in the general proximity of each other. A single interrogating transmitter/receiver (or a plurality thereof) is also placed in the proximity of containers 110 and preferably above them by a distance suitable, in view of the interrogator antenna radiating pattern, to cover the locations of RFID tag arrays 140 within the respective containers. Thus, it is seen that RFID tags from all of the arrays 140 may be interrogated simultaneously or at least concurrently. Different containers can be distinguished from each other by a variety of techniques such as unique identification numbers or codes (for active RFID tags), different interrogation frequencies, different return frequencies, time multiplexing, interrogator directional antenna or radiating pattern adjustment including collimation as described in the above-incorporated, concurrently filed U.S. patent application, correlation with previous measurements, and the like which will be evident to those skilled in the art. If desired or necessitated by the geometry of the container location(s) more than one interrogation transmitter/receiver can also be used and the measurement results communicated over a wired or, preferably, wireless network (indicated by bracket 325 in FIG. 3) to one or more data processor locations, as may be desired.

Figure 5:
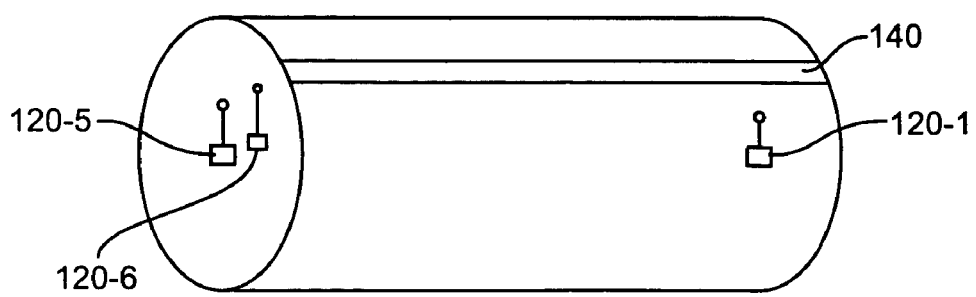
FIG. 5 illustrates application of the invention to critical level sensing and monitoring of container orientation.

Two additional applications of the invention will now be explained in connection with FIG. 5. It was noted above that plural or arcuate RFID tag arrays could be used to measure container orientation. In some cases only a single or a pair of RFID tags may be required for certain orientations of interest.

Consider closed containers placed on shelves where it is desired that the containers be in an upright orientation (e.g. resting on an end opposite the container closure). If an array such as 140 of FIG. 1 is used and the containers are nominally full, only RFID tag 5 will respond if the container is correctly oriented. If the container is on its side or inverted, such a condition can be detected over a very large number of containers (as might be desirable for confirming correct positioning of products in a retail sales operations) using only RFID tag 120-5, which will not respond if the container is improperly oriented or a pair of RFID tags 120-1 and 120-5 from which a differential response would be expected if the container is properly oriented. In such a case, using RFID tags 120-1 and 120-5 or using an RFID tag array (e.g. 140) it is preferable that the upper and lower RFID tags be different distances from the ends of the container at distances from the container ends respectively less than and greater than the distance of a material surface from the top of a nominally full container. In such a case, an inverted container can be discriminated without a need to discriminate between RFID tags. Similarly, if an array 140 is placed on the internal side of the container, all RFID tags will respond or not respond together depending on the rotational orientation of the container if the container is on its side and only the lowermost RFID tag 1 in the array will respond if the container is inverted.

A single or small plurality of RFID tags in an array (in this example comprising RFID tags 120-5 and 120-6) much shorter than a vertical dimension of the container can also be used for making a critical material level measurement such as might be required in a steam boiler. In such a case, the RFID tag(s) can be placed close to each other at approximately the desired level and measurement of material level across a single RFID tag (e.g. 120-5) or the short and closely spaced array measured in the manner described above and refined by measurement of return signal strength. The material level can be maintained by adding material when the return signal strength rises or when a differential response from RFID tags of the short array is not obtained; beginning or halting the addition of material when the return signals tend toward the same signal strength. Further, a plurality of containers can be simultaneously or concurrently monitored substantially continuously with simplified communications and processing arrangements.

As alluded to above, collimation of the RF signals by shielding can also provide an additional instrumentality by which the identities of RFID tags can be identified singly or in groups. Provision of such an additional instrumentality can be important in some applications depending on the number of RFID tags to be distinguished, the repetition rates of measurements needed and the bandwidth available. In essence, collimation allows the measurement portion of the system to be multiplied to any necessary degree within the same overall physical measurement system.

Figure 6A:
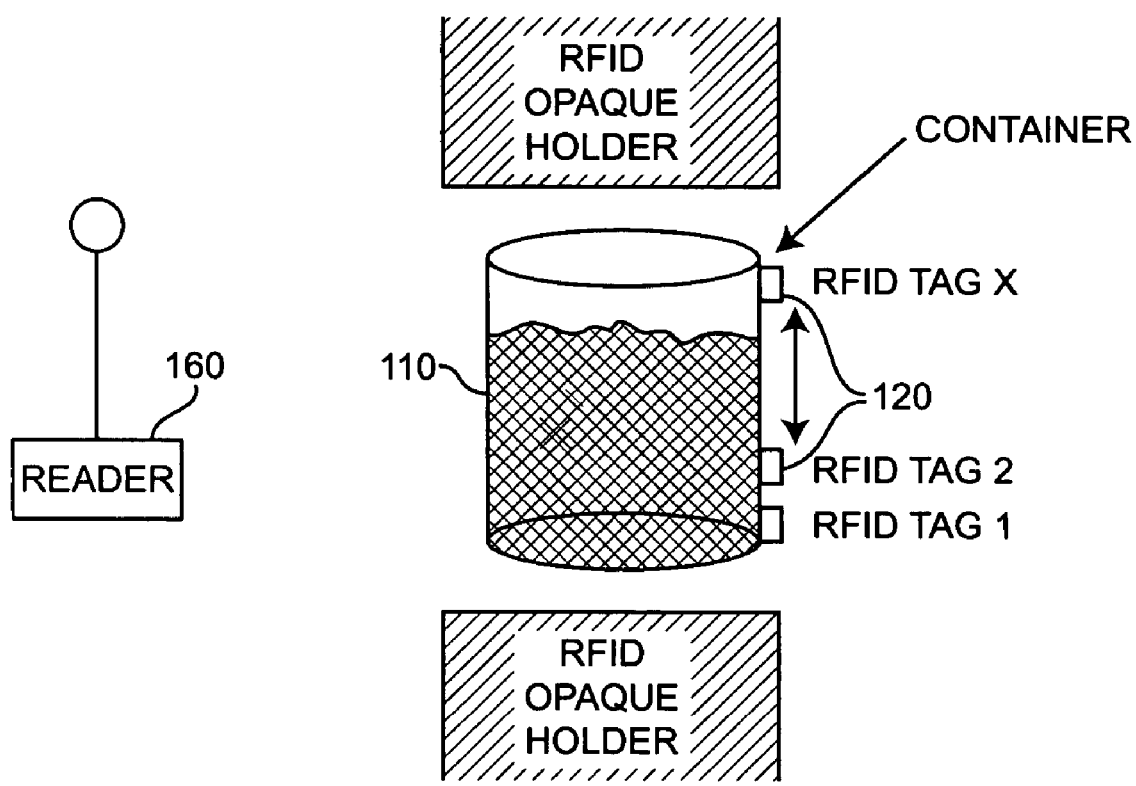
FIGS. 6A, 6B, 6C and 6D illustrate exemplary measurement arrangements using collimation of radio signals between the interrogator and RFID tags.
Figure 6B:
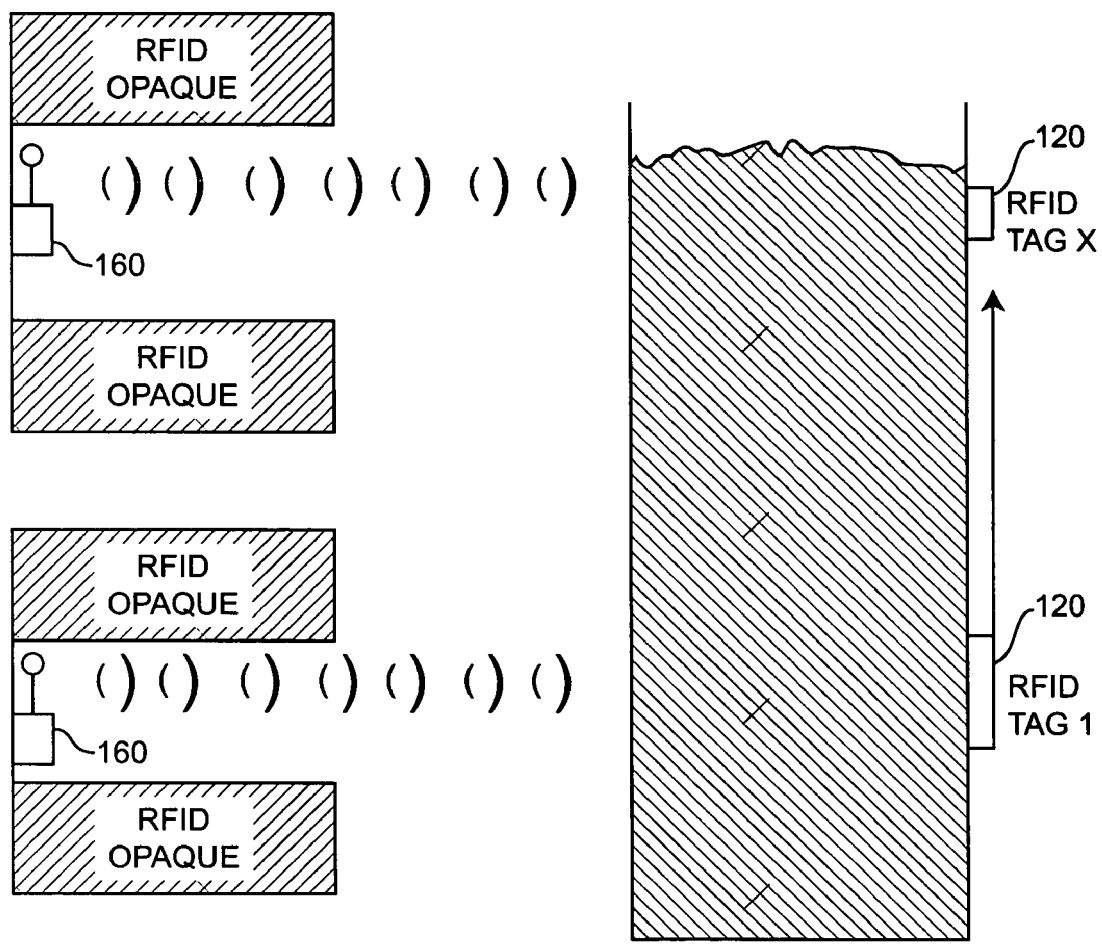
Figure 6C:
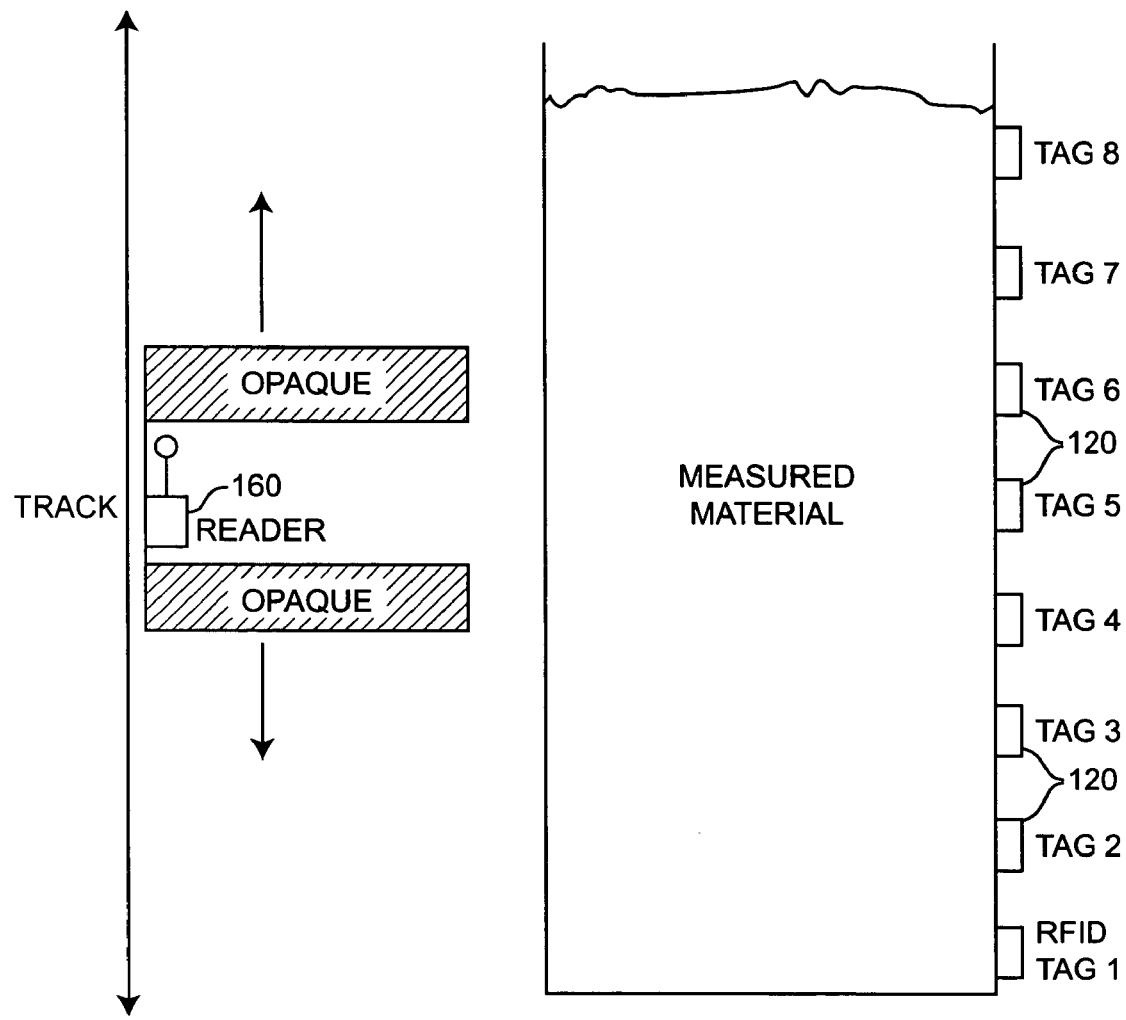
Figure 6D:
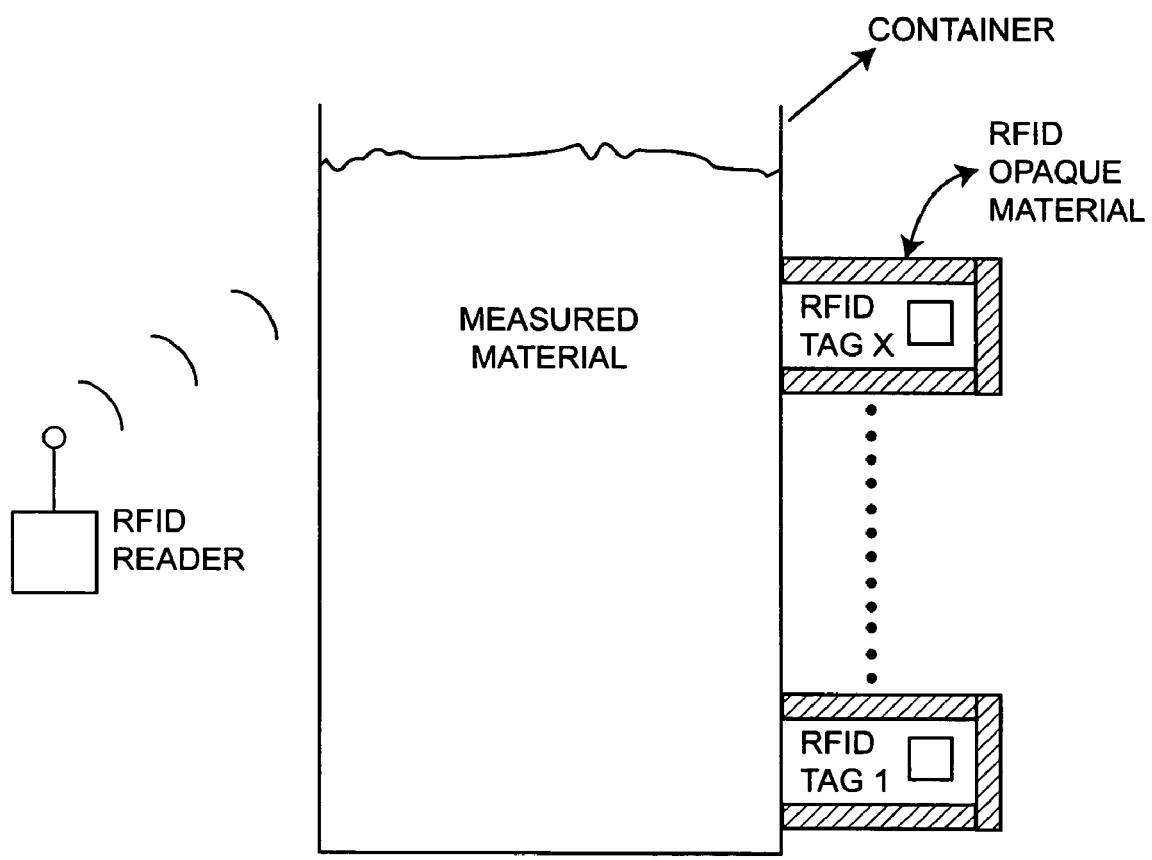

For example, FIG. 6A illustrates using RF opaque holders or shields to isolate an individual container 110 while the reader 160 communicates with all of the RFID tags associated therewith. Such an arrangement is equally applicable to a group of containers or one or more containers in a particular area. FIG. 6B illustrates an alternative arrangement in which shielding is provided for each of a plurality of readers/interrogators 160 such that each communicates only with a corresponding RFID tag 120. Such an arrangement would be advantageous in applications where bandwidth was extremely limited or only a single frequency or pair of frequencies possible or for measurement with only a few RFID tags. A similar arrangement having similar advantages is illustrated in FIG. 6C in which a single (or more) shielded reader/interrogator 160 with a collimated RF field is moved, for example, along a track to communicate with respective RFID tags 120. This arrangement has the additional advantages of reducing the number of readers/interrogators needed (e.g. for a large plurality of RFID tags for high measurement resolution), controllable/variable accuracy and accommodation of container geometry and an inherent encoding or identification of RFID tags as a function of reader/interrogator movement over time. Alternatively, as shown in FIG. 6D, shielding can be applied to individual RFID tags interrogated by a single reader 160 which may be movable (as in FIG. 6C) or stationary. This arrangement has the advantage of regulating the communication path particularly through materials which may tend to scatter RF energy or provide relatively lower attenuation of RF signals, particularly where measurement is made based on measured signal strength without imposing a threshold.

In view of the foregoing, it is seen that the invention provides for volumetric measurement of material and/or material level monitoring with a simple system which is applicable to all materials which have a significant opacity to RF energy, whether solid or liquid. Orientation of containers can also be monitored and other parameters such as hydrostatic pressure can be measured, as well. The apparatus and method of the invention are readily applicable to both solid and liquid materials and allow RFID tags of a single type or differentiated in readily available and inexpensive techniques to be used. The system and apparatus is also applicable to suspensions and slurries of materials and is not fouled by viscous and/or adhesive materials since even a relatively thick coating of such materials on the RFID tags or protective sleeve covering them will be substantially thinner than a layer of material immersing them and thus sufficiently less opaque to RF energy for material measurements to be made in accordance with the invention.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An apparatus for measurement of a level within a container of a material capable of attenuating radio frequency energy, said apparatus comprising
    a radio transponder at a known location relative to said container, and
    an interrogation transmitter/receiver capable of transmitting a radio frequency signal to said radio transponder across a portion of said container capable of containing said material and evaluating a return signal to determine presence of said material in said portion of said container.

2. An apparatus as recited in claim 1, wherein said transponder is a radio frequency identification (RFID) tag located within said container.

3. An apparatus as recited in claim 2, wherein said RFID tag is supported in said container by a sleeve.

4. An apparatus as recited in claim 3, further including a plurality of RFID tags in a spaced array.

5. An apparatus as recited in claim 4, wherein said spaced array of said plurality of RFID tags is linear.

6. An apparatus as recited in claim 4, wherein said spaced array of said plurality of RFID tags is arcuate.

7. An apparatus as recited in claim 4, wherein said spaced array of said plurality of RFID tags extends in at least two directions.

8. An apparatus as recited in claim 4, wherein spacing of said RFID tags in said spaced array is equal.

9. An apparatus as recited in claim 1, including another RFID tag located in proximity to said RFID tag, said RFID tag and said second RFID tag defining a level of interest.

10. An apparatus as recited in claim 1, including another RFID tag, said RFID tag and said another RFID tag defining a container orientation of interest.

11. An apparatus as recited in claim 1, further including RF opaque material applied to one of said RFID tag and said interrogation transmitter/receiver to define a communication path therebetween.

12. An apparatus as recited in claim 1, further including a delay arrangement to control measurement repetition frequency.

13. An apparatus as recited in claim 1, further including a memory accessible in accordance with an identification of said RFID tag.

14. An apparatus as recited in claim 12, wherein said memory stores at least one of level information, volume information, container identification information and pressure information.

15. A method for measuring material level in a container, said material being capable of attenuating a signal passing therethrough, said method comprising steps of
    transmitting a signal through a portion of a container to a transponder, said portion of said container being capable of containing said material, and
    detecting said material in said portion of said container based on a return signal returned from said transponder.

16. A method as recited in claim 15, including a further step of
    determining a volume of material in said container based on said signal returned from said transponder.

17. A method as recited in claim 15, including a further step of
    determining an orientation of said container based on said signal returned from said transponder.

18. A method as recited in claim 15, including a further step of
    determining an identification of said container based on said signal returned from said transponder.

19. A method as recited in claim 15, including a further step of collimating one of said signal and said return signal.

20. A method as recited in claim 15, including a further step of controlling repetition frequency of said transmitting and detecting steps.

* * * * *